Oct. 10, 1939.  W. H. MARTZ  2,175,668
ELECTRIC HEATER
Filed July 27, 1936  3 Sheets-Sheet 2

INVENTOR
William H. Martz
BY
Donald U. Rich
ATTORNEY

Oct. 10, 1939.  W. H. MARTZ  2,175,668
ELECTRIC HEATER
Filed July 27, 1936  3 Sheets-Sheet 3
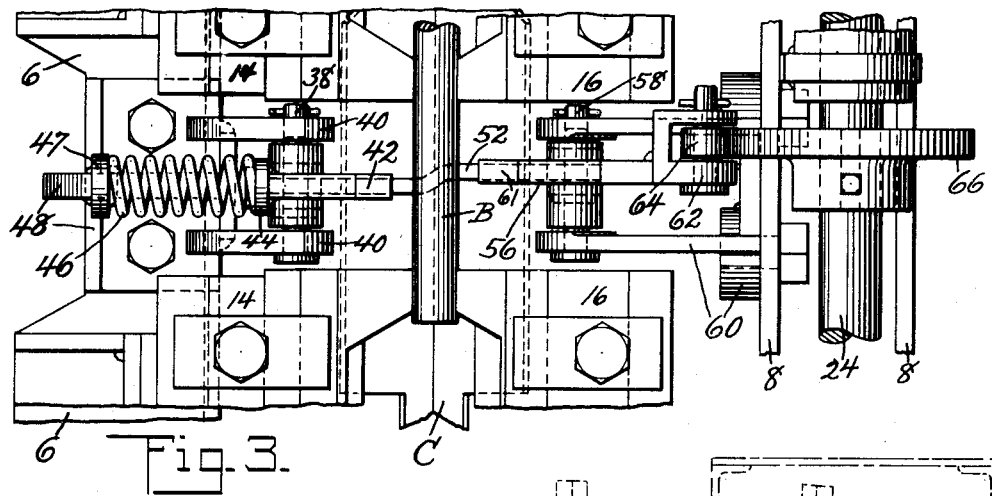
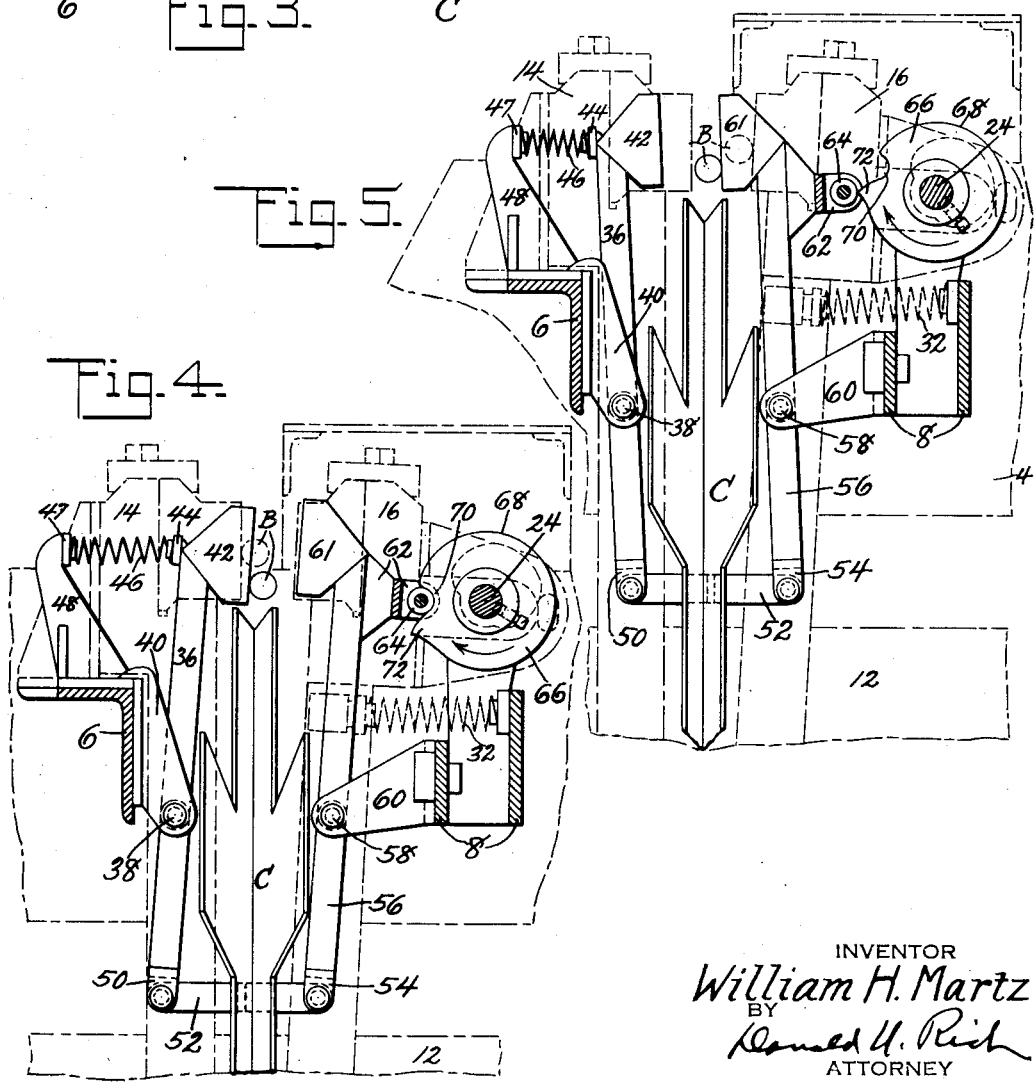
INVENTOR
William H. Martz
BY
ATTORNEY Patented Oct. 10, 1939

2,175,668

UNITED STATES PATENT OFFICE 2,175,668

ELECTRIC HEATER

William H. Martz, Berwick, Pa., assignor to American Car and Foundry Company, New York, N. Y., a corporation of New Jersey Application July 27, 1936, Serial No. 92,733

14 Claims. (Cl. 219—11)

This invention relates to electric heaters in general and in particular to automatic electric stock heaters.

In the operation of electric stock heaters, especially the automatic type, considerable delay is caused by the partial fusing of the heated material to the electrodes and its failure to fall clear when the electrode jaws are opened. Various devices have been proposed to remove the material from the jaws but have failed to operate properly due to the wide variance in position of the material and its size. It is an object of the invention therefore to provide a positive mechanical means to remove the heated material from the jaws irrespective of the position of the material.

Another object of the invention is the provision of a mechanical means to remove the heated material from the electrode jaws irrespective of the size or shape of the material.

These and other objects of the invention will be apparent to those skilled in the art from a study of the following description and accompanying drawings, in which:

Fig. 3 is a partial plan view of the material remover, together with certain parts of the heater;

Fig. 4 is a side view of the material remover in one position of movement, and

Fig. 5 is a similar side view showing the remover in another position of movement.

Figure 1:
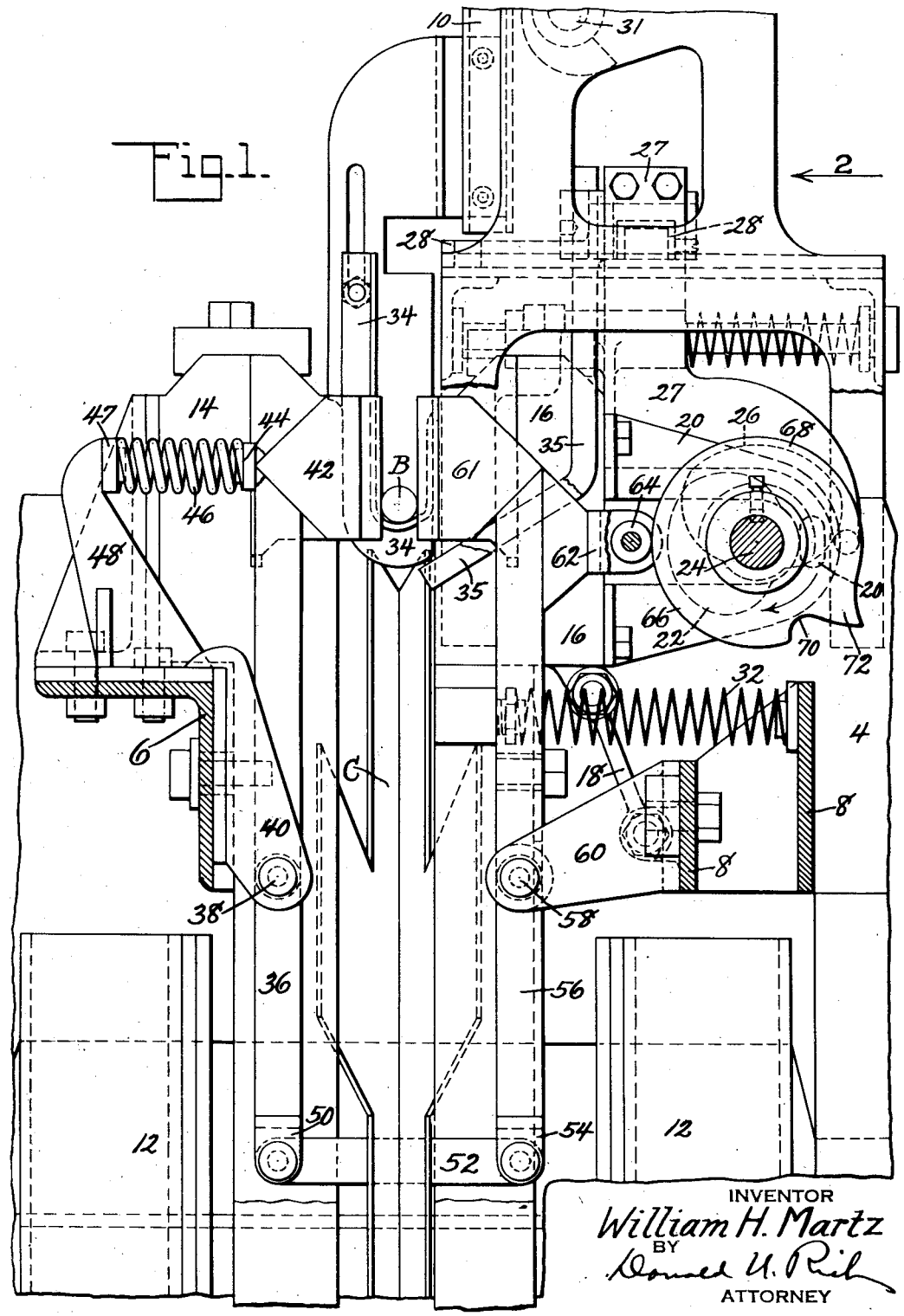
Figure 1 is a side view of an electric heater with the improved device applied thereto and in the normal position.
Figure 2:
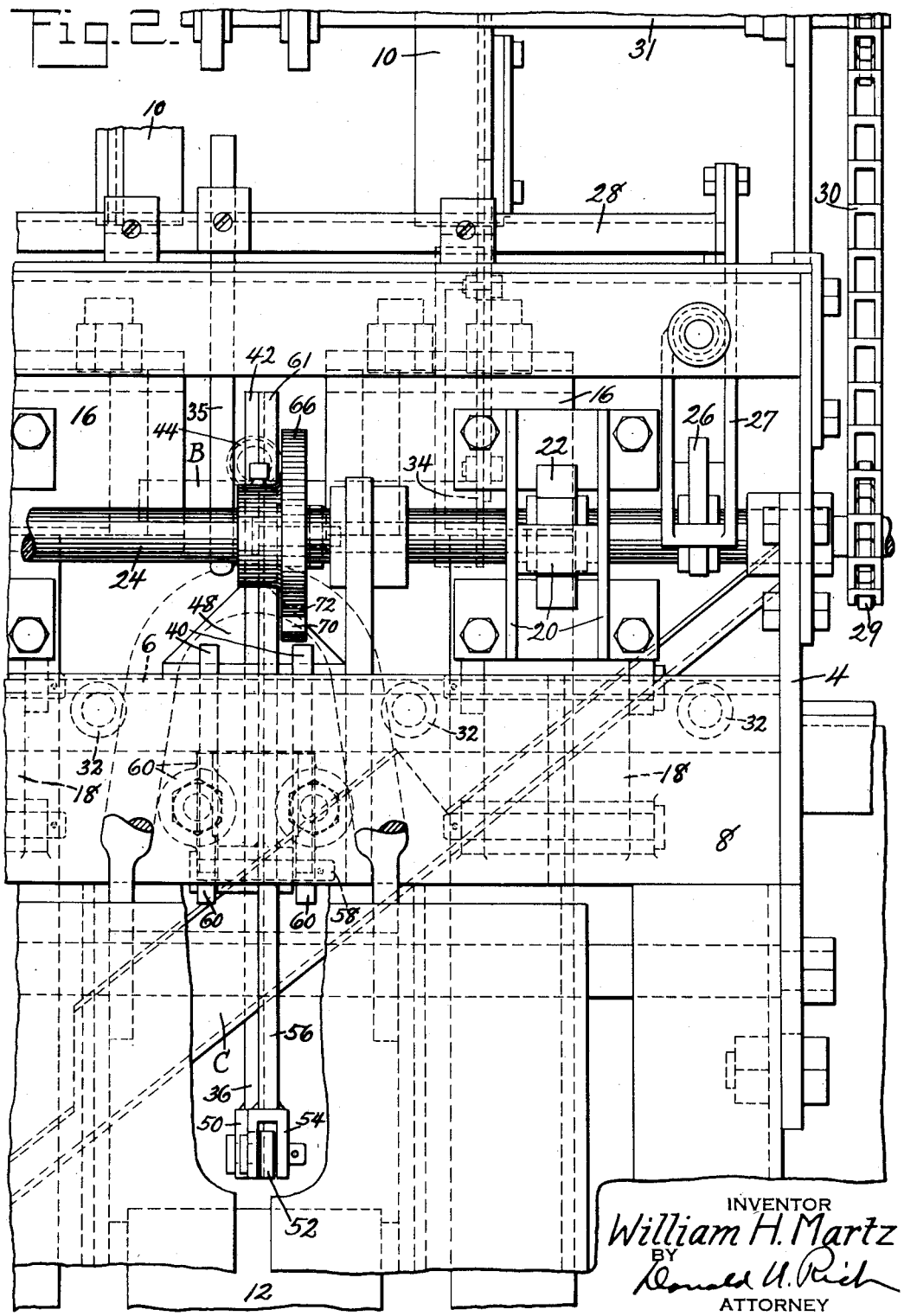
Fig. 2 is a back view of the electric heater of Fig. 1 looking in the direction of the arrow 2.

Referring now to the drawings in detail, it is seen that the material remover or kicker has been applied to a heater of the general type shown in Bitler and Evans application 23,176, now Patent 2,094,977 of October 5, 1937, and to which reference may be had for a more detailed description of the machine. The machine is in general formed of side members 4 joined together by suitable cross members, such as angle 6 and crossbars 8, to form a frame. The frame carries a material hopper 10 and transformer 12 from which current is supplied to the relatively fixed electrode jaw 14 suitably mounted on the angle 6 and to the relatively movable electrode jaw 16 carried upon one of the bars 8 by the supporting link 18. The movable electrode is operated by means of control arm 20 engaging electrode control cam 22 carried upon cam shaft 24. The cam shaft is also provided with feeder cam 26 which through arms 27 operates the material feeder or pusher 28 and with a sprocket 29 which through chain 30 drives an agitator rod 31 carried by the hopper to insure proper supply of material to the pusher. The removable electrode is as usual held by spring 32 in gripping engagement with the material B which is to be heated and this material after heating is released by the electrode jaws and is free to drop upon chute C for discharge out of the machine.

The vertical position of the material to be heated may be easily controlled by adjusting the support 34 carried by the hopper and the support 35 carried by the pusher or feeder bar. The adjustment of these supports permits the use of the full face area of the electrode jaws, thus giving longer life of the jaws. It is, of course, obvious that all sizes of materials may be heated which fall within the capacity of the machine.

Referring now to the material remover or kicker, it is seen that in the form shown this consists of a bar 36 pivotally mounted as at 38 upon bracket 40 secured to the angle 6. The upper end of the bar is provided with a kicker head 42 and a spring seat 44 against which one end of spring 46 bears, while the other end bears against spring seat 47 formed on bracket 48 likewise carried by the angle 6. The lower end of the bar is bifurcated at 50 to pivotally support one end of connecting link 52, the other end of which is pivotally supported by the lower bifurcated end 54 of a second bar 56. The second or power controlled bar is pivotally mounted as at 58 upon bracket 60 secured to a suitable frame part, such as the frame bar 8. The upper end of this second or power controlled bar is provided with a kicker head 61 and with a rearwardly directed extension 62 carrying roller or cam follower 64 adapted to engage the kicker cam 66 suitably secured to the cam shaft in the proper position.

The kicker cam is provided with a major portion 68 which is concentric with the cam shaft and with a minor portion having a dip or recess 70 immediately adjacent a projection 72. It is thus seen that rotation of the kicker cam will cause relatively rapid movement of the cam follower and, therefore, of the kicker bars.

The operation of the device is as follows: Assuming the parts to be in the position shown in Figs. 1 and 3 in which the bar B is shown as being heated and the kicker head 42 as spaced from the bar. After the bar has reached the proper temperature, controls (not shown) are tripped which cause rotation of the cam shaft and cams and movement of the movable set of electrode jaws 16 to release the heated bar which will drop on to the chute C unless it is stuck to the jaws. In any event continued rotation of the cam brings the depression or recess 70 opposite the roller 64 permitting spring 46 to snap the kicker head 42 to the right dislodging the bar if stuck to the fixed jaw and the parts will then be in the position shown in Fig. 4. Immediately after this quick movement to the right the roller 64 will ride upon cam projection 72 causing the kicker head 61 to move rapidly to the left dislodging the bar when stuck to the movable electrode jaw and the parts will then be in the position shown in Fig. 5. It is, of course, obvious that due to the arrangement of the pivots 38, 50 and the connecting links 52 that the kicker heads must move in unison and in the same direction and will always maintain the same spacing, which is slightly greater than the maximum diameter or width of the material that the machine will accommodate. The kicker faces having the same vertical depth as the electrode jaws will positively remove the heated bar irrespective of its size or location and will, therefore, require no adjustment for different operating conditions.

While the improved machine has been described more or less in detail, it is to be understood that it is merely illustrative, since various modifications and arrangements may be suggested, but all such modifications and arrangements are contemplated as fall within the scope of the following claims.

I claim:

1. In an electric heater the combination of a frame, fixed electrodes mounted on the frame, movable electrodes carried by the frame, means to move said movable electrodes toward the fixed electrodes to grip material for heating, kicker heads adjacent said electrodes, said kicker heads being spaced from the electrodes and independent thereof, means supporting said heads on the frame and means associated with said first-named means to operate said kicker heads for removal of heated material from the electrodes.

2. In an electric heater the combination of a frame, spaced apart fixed electrodes mounted on the frame, spaced apart movable electrodes carried by the frame, means to move said movable electrodes toward the fixed electrodes to grip material for heating, kicker heads pivotally connected to the frame intermediate said electrodes, means positively interconnecting said kicker heads for substantially simultaneous movement, and means associated with said first-named means to operate said kicker heads for removal of heated material from the electrodes.

3. In an electric heater the combination of a frame, fixed electrodes mounted on the frame, movable electrodes carried by the frame, means to move said movable electrodes toward the fixed electrodes to grip material for heating, kicker heads pivotally connected to the frame adjacent said electrodes, means interconnecting said kicker heads for substantially simultaneous movement, and means associated with said first-named means causing back and forth operation of said kicker heads for removal of heated material from either of the electrodes in sequence.

4. In an electric heater the combination of a frame, fixed electrodes mounted on the frame in spaced relation, movable electrodes carried by the frame in spaced relation, means to move said movable electrodes toward the fixed electrodes to grip material for heating, kicker heads adjacent said electrodes, means supporting said heads on the frame in a position intermediate the electrodes, and cam means associated with said first-named means to operate said kicker heads for removal of heated material from the electrodes.

5. In an electric heater the combination of a frame, fixed electrodes mounted on the frame, movable electrodes carried by the frame, means to move said movable electrodes toward the fixed electrodes to grip material for heating, kicker heads pivotally connected to the frame adjacent said electrodes, means interconnecting said kicker heads for substantially simultaneous movement, resilient means urging said kicker heads in one direction, and cam means connected with said first-named means causing back and forth movement of the kicker heads whereby heated material will be removed from either of the electrodes in sequence.

6. In an electric heater the combination of a frame, fixed electrodes mounted on the frame, movable electrodes carried by the frame, means to move said movable electrodes toward the fixed electrodes to grip material for heating, kicker heads adjacent said electrodes, means supporting said heads on the frame and means associated with said first-named means causing back and forth operation of the kicker heads whereby heated material will be loosened from either of the electrodes in sequence.

7. In an electric heater the combination of a frame, fixed electrodes mounted on the frame, movable electrodes carried by the frame, means to move said movable electrodes toward the fixed electrodes to grip material for heating, kicker heads located on opposite sides of the material, said kicker heads being spaced apart a predetermined amount at all times, means supporting said heads on the frame independently of the electrodes, and means for operating said kicker heads for removal of heated material from the electrodes.

8. In an electric heater the combination of a frame, fixed electrodes mounted on the frame, movable electrodes carried by the frame, means to move said movable electrodes toward the fixed electrodes to grip material for heating, kicker heads located on opposite sides of the material, means supporting said heads on the frame and independently of the electrodes, and means operating said kicker heads in unison for removal of heated material from the electrodes.

9. In an electric heater the combination of a frame, fixed electrodes mounted on the frame, movable electrodes carried by the frame, means to move said movable electrodes toward the fixed electrodes to grip material for heating, kicker heads located on opposite sides of the material, means supporting said heads on the frame, and means operating said kicker heads in unison and alternately in opposite directions for sequential removal of heated material from the electrodes.

10. In a machine of the class described, pivotally supported work-removing means, and cam and resilient means associated therewith and operative alternately to shift said work-removing means in opposite directions on its pivotal mounting.

11. In a machine of the class described, a frame, work-removing means pivotally mounted on said frame, and cam and resilient means associated with said work-removing means and operative alternately to actuate said work-removing means in opposite directions.

12. In a machine of the class described, work-removing means including spaced work-contacting heads, means pivotally supporting said work-removing means, and cam and resilient means operative alternately to shift said work-removing means in opposite directions on its pivotal support.

13. In a machine of the class described, work-removing means including a pair of work-contacting heads, means pivotally supporting said work-removing means, link means associated with said work-removing means and maintaining said heads in predetermined spaced relation at all times, and means operative to alternately shift said work-removing means in opposite directions and in unison.

14. In a machine of the class described, work-removing means comprising a pair of pivotally supported bars, work contacting heads carried by said bars, a link connecting said bars whereby said heads are maintained in predetermined spaced relation at all times, and means operative to alternately shift said work-removing means in opposite directions.

WILLIAM H. MARTZ.